(12) United States Patent
Yu et al.

(10) Patent No.: US 10,320,477 B2
(45) Date of Patent: Jun. 11, 2019

(54) SYSTEM AND METHOD FOR AUTOMATIC DISCOVERY OF OPTICAL CABLE ROUTE

(71) Applicant: ACCELINK TECHNOLOGIES CO., LTD., Hubei (CN)

(72) Inventors: Shizhan Yu, Hubei (CN); Quanzhong Zhang, Hubei (CN); Falong Liu, Hubei (CN); Qing Luo, Hubei (CN); Zhizhu Zhou, Hubei (CN); Jiekui Yu, Hubei (CN)

(73) Assignee: Accelink Technologies Co., Ltd., Hubei (CN)

( * ) Notice: Subject to any disclaimer, the term of this patent is extended or adjusted under 35 U.S.C. 154(b) by 0 days.

(21) Appl. No.: 15/560,129

(22) PCT Filed: Dec. 15, 2015

(86) PCT No.: PCT/CN2015/097456
§ 371 (c)(1),
(2) Date: Sep. 20, 2017

(87) PCT Pub. No.: WO2016/150204
PCT Pub. Date: Sep. 29, 2016

(65) Prior Publication Data
US 2018/0102837 A1  Apr. 12, 2018

(30) Foreign Application Priority Data

Mar. 20, 2015  (CN) .......................... 2015 1 0124484

(51) Int. Cl.
*H04B 10/032* (2013.01)
*H04B 10/071* (2013.01)
(Continued)

(52) U.S. Cl.
CPC .......... *H04B 10/077* (2013.01); *H04B 10/032* (2013.01); *H04B 10/071* (2013.01); *H04B 10/07955* (2013.01); *H04M 11/04* (2013.01)

(58) Field of Classification Search
CPC ............ H04B 10/077; H04B 10/07955; H04B 10/071; H04B 10/032; H04M 11/04
See application file for complete search history.

(56) References Cited

U.S. PATENT DOCUMENTS

2006/0153496 A1* 7/2006 Tanobe ............... H04J 14/0227
385/24

FOREIGN PATENT DOCUMENTS

| CN | 101018089 A | 8/2007 |
|---|---|---|
| CN | 101252393 A | 8/2008 |

(Continued)

OTHER PUBLICATIONS

PCT International Search Report dated Mar. 3, 2016, PCT Application No. PCT/CN2015/097456.
(Continued)

*Primary Examiner* — Leslie C Pascal
(74) *Attorney, Agent, or Firm* — Vierra Magen Marcus LLP

(57) ABSTRACT

A system and method for automatic discovery of an optical cable route. The method comprises: a light source power meter automatically monitoring an attenuation value of an optical cable fiber core, the optical cable fiber core being configured in an optical cable route; when the power meter generates an alarm, determining a level of the optical power alarm and reporting the alarm condition of the optical cable route in real time; and a drive automatically searching for available optical cable routes to provide options of available optical cable routes for real-time allocation of services.

11 Claims, 3 Drawing Sheets

(51) Int. Cl.
*H04B 10/077* (2013.01)
*H04B 10/079* (2013.01)
*H04M 11/04* (2006.01)

(56) References Cited

FOREIGN PATENT DOCUMENTS

| CN | 102098100 A | 6/2011 |
|---|---|---|
| CN | 102412895 A | 4/2012 |
| CN | 102523037 A | 6/2012 |
| CN | 103107941 A | 5/2013 |
| CN | 104796190 A | 7/2015 |

OTHER PUBLICATIONS

Chinese Office Action dated Dec. 26, 2016, Chinese Patent Application No. 200610007413.8.

* cited by examiner 1. configuring optical cable fiber cores in the optical cable routes 2. power meters automatically monitoring power alarm of the optical cables 3. the optical cable route in-use giving an alarm 4. automatically searching for available routes

SYSTEM AND METHOD FOR AUTOMATIC DISCOVERY OF OPTICAL CABLE ROUTE

This application is a National Stage application of PCT international application PCT/CN2015/097456, filed on Dec. 15, 2015 which claims priority to Chinese Patent Application No. 201510124484.5 titled "Automatic Discovery Method and System for Optical Cable Route," filed on Mar. 20, 2015, both of which are incorporated herein by reference in their entireties.

TECHNICAL FIELD

The present invention relates to a system and method for automatic discovery of an optical cable route, and the present invention belongs to the field of communication.

BACKGROUND

With development of optical fiber communication technique and continuous expansion of the optical fiber communication network, infrastructure of the optical network becomes more and more complicate, and it becomes more and more important to manage resources of the optical network efficiently and to schedule the optical path quickly so as to recover services interrupted due to failure of the optical cable routes. As a comprehensive monitoring of the optical cable resources is very complicate and difficult, daily network maintenance and resource allocation cannot be done only by manual operations, and an intelligent system is needed. Especially for scheduling of the optical cable resources, it conventionally depends on manual inquiring and graphic searching. Resource checking and optimal route searching cost much time and labor, and the efficiency is low. Determination of optical cable resources and selection of a route cannot be implemented based on real time data and lack objectivity and a global view. Especially for scheduling of optical cable resources having many nodes and complex connections, a large number of working hours are needed for data inquiring and route searching, causing low efficiency and low reliability in scheduling of the optical cable resources.

SUMMARY

In order to solve the above mentioned technical problems, the present invention provides a method for automatic discovery of an optical cable route in an optical transmission system characterized in comprising the following steps: 1) configuring information of physically deployed optical cable routes according to physical site data, the information of physically deployed optical cable routes including optical cable fiber core resources; 2) automatically monitoring, by power meters, optical power of receiving fibers in the optical cable and generating an optical power alarm when the optical power is beyond a predefined threshold; 3) determining a level of the optical power alarm and reporting the optical cable route with which the optical power alarm is related in real time when the optical power alarm is generated; 4) automatically searching for available optical cable routes to provide options of available optical cable routes for real-time allocation of services in the optical transmission system.

In the above technical solution, the step 1) of configuring information of physically deployed optical cable routes, including optical cable fiber core resources, according to physical site data includes: establishing optical cable data and optical cable routes on a network management system (NMS) server in the optical transmission system, the optical cable data including information of the optical cables and information of the fiber cores, the information of the fiber cores being configured in the optical cable routes, the optical cable route including one or more optical cable route segments, the optical cable route segments being logic optical cables between different sites in the optical transmission system, the logic optical cables corresponding to resources of the optical cables actually used in the optical transmission system by configuring information of the optical cables and information of the fiber cores; the optical power of the fiber cores in the optical cables actually used in the optical transmission system being monitored to reflect an alarm condition of the corresponding optical cable routes.

In the above technical solution, the optical power automatically monitored by the power meters in the step 2) comes from a source that is a monitoring light emitted by a light source at an opposite end or a part of service light split out from the optical transmission system.

In the above technical solution, the level of the optical power alarm mentioned in the step 3 includes four levels corresponding to a prompt alarm, a secondary alarm, a primary alarm and an urgent alarm having thresholds of 0.5 dB, 1 dB, 3 dB and 5 dB respectively.

In the above technical solution, the step 4) of automatically searching for available optical cable routes includes automatically searching for optical cable routes currently available meeting requirements of optical cable route length, attenuation of the optical cable, and number of relay sites according to start site and end site of the optical cable route, the optical cable resources recorded in the system, and the real-time optical power monitoring data when an alarm is generated relating to the optical cable route that is being used in the optical transmission system.

The present invention further provides a system for automatic discovery of an optical cable route in an optical transmission system, characterized in comprising: a local area network (LAN); a database server in direct communication with the LAN; an element management system (EMS) server in communication with the LAN to access and operate the database server; a client in communication with the LAN; a plurality of light source monitoring devices in communication with the LAN to transmit light source monitoring data to the EMS server for processing; a plurality of optical power meter monitoring devices in communication with the LAN to transmit optical power meter monitoring data to the EMS server for processing.

In the above technical solution, the system further comprises a network management system (NMS) server in communication with the LAN through a CORBA northbound interface.

The present invention achieves the following technical effects:

① The present invention not only manages all the services in the system and information of the optical cable routes used by the services, but also monitors the optical cable fiber cores in the system in real time. Compared with conventional optical cable monitoring systems, the present invention has additional functions of analyzing real-time monitoring data and automatically searching for the optical cable routes, so that an intelligent scheduling function based on real-time optical cable monitoring data is achieved, and the availability of the system is greatly improved and the scheduling time of the system is shortened, thereby providing a powerful guarantee for the recovery capability of the system.

② The present invention implements a comprehensive monitoring on the optical cable resources so that availability and reliability of the optical cable route generation may be guaranteed.

DESCRIPTION OF EMBODIMENT

In order for those skilled in the art to understand and implement the present invention, hereinafter, the present invention is further described in connection with embodiments and accompanying drawings.

Figure 3:
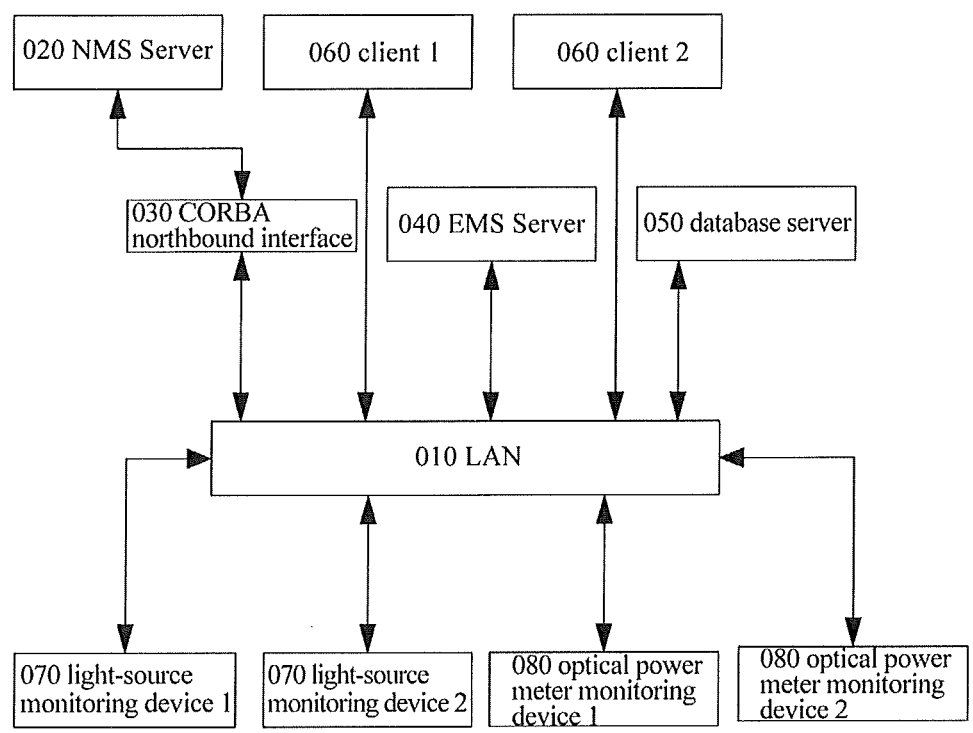
FIG. 3 is a schematic block diagram showing a system for implementing a method according to an embodiment of the present invention.

FIG. 3 shows a system for implementing a method for automatic discovery of an optical cable route according to an embodiment of the present invention, which includes a local area network (LAN) 010, a network management system (NMS) server 020 in communication with the LAN 010 through a CORBA northbound interface 030, two clients 60 in direct communication with the LAN 010, an element management system (EMS) server 040 and database 050 in direct communication with the LAN 010, and a plurality of light source monitoring device 070 and a plurality of power meter monitoring device 080 in direct communication with the LAN 010.

Figure 1:
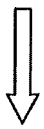
FIG. 1 is a flow chart showing a maintenance process of the optical cable according to an embodiment of the present invention.
Figure 1:
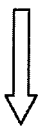
Figure 1:

As shown in FIG. 1, a method for automatic discovery of an optical cable route according to an embodiment of the present invention includes the following steps:

1) configuring information of physically deployed optical cable routes according to physical site data, the information of optical cable routes including resources of optical cable fiber cores;

In Step 1, optical cable data and optical cable routes are established on the NMS server 040 in the system and stored in the database. The optical cable data includes a constitution of optical cables and fiber cores, and the fiber cores are configured in the optical cable routes. In detail, Step 1 may further include following steps:

a) creating all sites and recording information of the sites in the database;

In Step a, the site information are recorded to make preparation for subsequent recording of optical cable resources. Information of all sites in the physical optical transmission system is recorded in the database, and the site information exists in the NMS server 040 as site objects;

b) creating all optical cables and recording information of the optical cables in the database;

In Step b, information of optical cable resources in the physical optical transmission system is recorded in the database, and an optical cable object between site objects is defined as an optical cable resource between a start site and an end site;

c) creating services existed in the physical optical transmission system and recording information of the services in the database;

In Step c, information of the services running in the physical optical transmission system is recorded in the database, and the information of the service is defined as an optical transmission service from a start site to an end site;

d) creating optical cable routes used by the respective services in the physical optical transmission system and recording information of the optical cable routes in the database;

The optical cable routes refer to all feasible light paths between a start site and an end site associated with a service object. The optical cable route consists of one or more optical cable route segments as a basic constituent element, and the optical cable route segment is a logic optical cable from a start site to an end site. The optical cable route is created by creating objects of optical cable route segments first and then combining one or more optical cable route segments together;

e) configuring actually used fiber cores of the optical cable routes and recording the configuration information in the database;

In Step e, each route segment of the optical cable route is associated with a fiber core actually used in the optical cable object, thereby successfully establishing the optical cable route. The fiber cores of the optical cable may have a condition of in-use, stand-by, fault and alarm. At the time of configuring association of the optical cable route segment with the fiber core actually used, the fiber cores already in the condition of in-use, stand-by and fault cannot be configured once again; after configuring the fiber cores of the optical cables, the logic optical cables can correspond to the physical optical cable resources. After configuration of the entire optical cable routes and the actually used fiber cores, the actually used fiber cores of the optical cables can be monitored to reflect alarm condition of the optical cable routes.

2) automatically monitoring, by power meters, power alarm of the optical cables;

In Step 2, the power meters placed in the sites monitor optical power of receiving fibers at the sites in real time. When the optical power decreases to a certain degree, the power meter generates an alarm signal. The optical power may come from any one of the following two sources: 1) a monitoring light emitted from a light source at an opposite end; 2) a service light split out from the physical optical transmission system (generally by a splitting ratio of 90:10, which has no effect on the services in the physical optical transmission system);

3) determining a level of the optical power alarm and reporting the optical cable route where the optical power alarm is generated in real time when the optical power alarm is generated;

In Step 3, when the EMS server 040 receives a power alarm from the power meter, it generates an alarm of the measured fiber core, and then generates an alarm of the optical cable route including the measured fiber core according to configuration relationship of the optical cable routes and the fiber cores and a decision threshold. In an embodiment of the present invention, the optical power alarm can have four levels of which the thresholds are 0.5 dB, 1 dB, 3 dB and 5 dB respectively, corresponding to a prompt alarm, a secondary alarm, a primary alarm and an urgent alarm. These thresholds may be set independently, and they may have different values for different optical cable lines according to actual needs. When an optical cable route reaches a threshold, a corresponding alarm may be generated.

4) automatically generating available optical cable routes to provide options of available optical cable routes for real-time allocation of the services.

Figure 2:
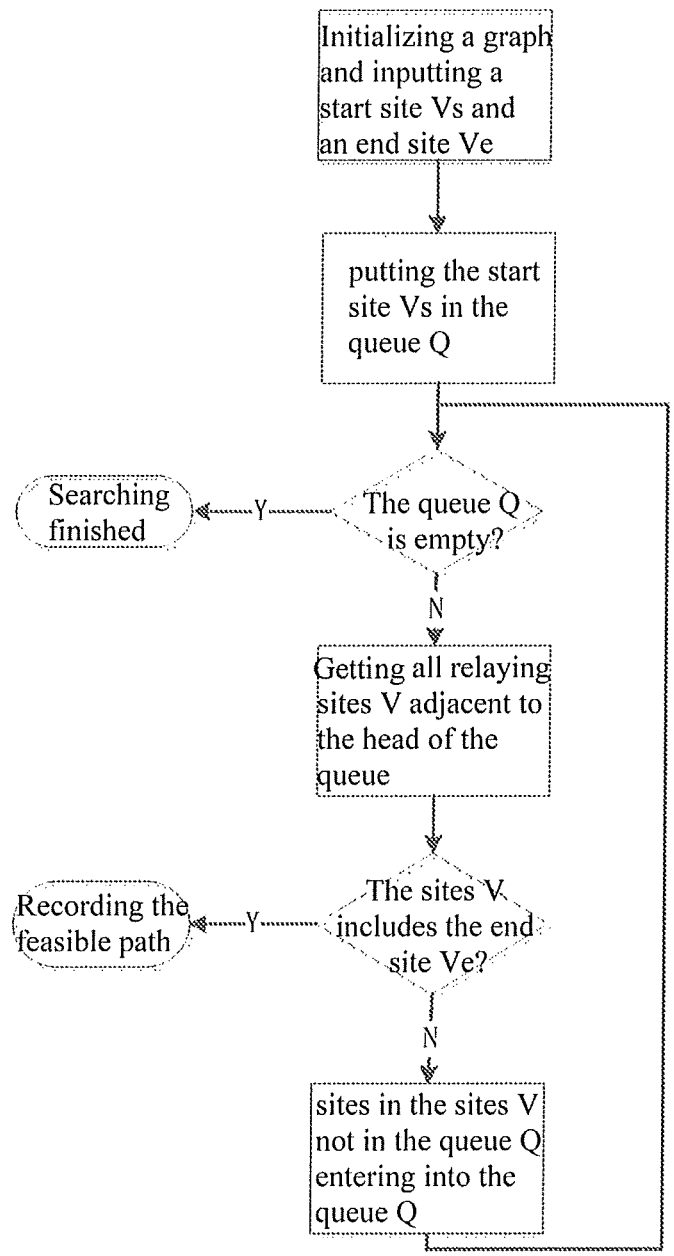
FIG. 2 is a flow chart showing a method of automatically searching for an optical cable route according to an embodiment of the present invention.

In Step 4, when an alarm is generated on an optical cable route that is being used for services in the EMS server 040, it indicates the optical cable route is malfunctioning. The system searches for optical cable routes available in the current resources, which includes the following steps:

a) acquiring a start site and an end site of the optical cable route to which the alarm is related;

In Step a, the start site and the end site of the optical cable route to which the alarm is related are acquired and submitted as parameters to an automatic route searching process.

b) the automatic route searching process searching out all feasible paths;

In Step b, the feasible paths may be searched out by using a graphic Breadth-First-Search algorithm in which the start site is used as a start point Vs of the searching process and the end site as the destination point Ve of the searching process. As shown in FIG. 2, the searching process is carried out as follows:

I. Put the start point Vs in a queue Q firstly.

II. Fetch out a node V at the head of the queue from the queue Q and check whether it is the destination point Ve.

If yes, the feasible path is recorded as an optional optical cable route.

Otherwise, all of unchecked relaying sites adjacent to the node V are added into the queue Q.

III. If the queue Q is empty, it means all sites have been checked, and no suitable route is found in the graph which is able to reach the destination point that is searched for. The searching process ends and returns "no suitable route".

IV. Go back to Step II and repeat Steps combine all optional optical cable routes into a list of optional optical cable routes.

c) selecting an optimal optical cable route;

In Step c, an optimal optical cable route is selected from the searching results of Step b. Firstly, the list of optional optical cable routes is filtered according to availability. If any of the fiber cores configured in the automatically generated optional optical cable route has an alarm or fault condition, the automatically generated optional optical cable route is filtered out. Secondly, all of the available optional optical cable routes are ordered according to number of relaying sites and route length to generate a final list of available optical cable routes.

The above-described embodiments are only preferred embodiments provided for sufficiently explaining the present invention, and the protection scope of the present invention is not limited thereto. Equivalent replacements or variations made by those skilled in the art based on the present invention all fall into the protection scope of the present invention as defined in the claims and its equivalents.

The invention claimed is:

1. A method for automatic discovery of an optical cable route in an optical transmission system, characterized in comprising following steps:

1) configuring, in a database, information of physically deployed optical cable routes according to physical site data, the information of physically deployed optical cable routes including optical cable fiber core resources;

2) automatically monitoring, by power meters, optical power of receiving fibers in the optical cable and generating an optical power alarm when the optical power is beyond one of a plurality of predefined thresholds;

3) determining, by an element management system (EMS) server, a level of the optical power alarm based on the one of the plurality of predefined thresholds and the optical cable route with which the optical power alarm is related in real time when the EMS server receives the optical power alarm from the power meters;

4) automatically searching, by the EMS server, the database for available optical cable routes to provide options of available optical cable routes for real-time allocation of services in the optical transmission system.

2. The method for automatic discovery of an optical cable route in an optical transmission system according to claim 1, characterized in that the step 1) of configuring, in a database, information of physically deployed optical cable routes, including optical cable fiber core resources, according to physical site data includes: establishing, at the EMS server, optical cable data and optical cable routes of the optical transmission system and storing the optical cable data and optical cable routes into the database, the optical cable data including information of the optical cables and information of the fiber cores, the information of the fiber cores being configured in the optical cable routes, the optical cable routes each including one or more optical cable route segments, the optical cable route segments being logic optical cables between different sites in the optical transmission system, the logic optical cables corresponding to resources of the optical cables actually used in the optical transmission system by configuring information of the optical cables and information of the fiber cores; the optical power of the fiber cores in the optical cables actually used in the optical transmission system being monitored to reflect an alarm condition of the corresponding optical cable routes.

3. The method for automatic discovery of an optical cable route in an optical transmission system according to claim 1, characterized in that the optical power automatically monitored by the power meters in the step 2) comes from a source that is a monitoring light emitted by a light source at an end of the receiving fibers opposite to the power meters or a part of service light split out from the optical transmission system.

4. The method for automatic discovery of an optical cable route in an optical transmission system according to claim 3, characterized in that the optical power alarm has four levels of a prompt alarm, a secondary alarm, a primary alarm and an urgent alarm corresponding to four thresholds of 0.5 dB, 1 dB, 3 dB and 5 dB respectively.

5. The method for automatic discovery of an optical cable route in an optical transmission system according to claim 1, characterized in that the step 4) of automatically searching for available optical cable routes includes automatically searching for optical cable routes currently available meeting requirements of optical cable route length, attenuation of the optical cable, and number of relay sites according to start site and end site of the optical cable route, the optical cable resources recorded in the database, and the real-time optical power monitoring data when an alarm is generated relating to the optical cable route that is being used in the optical transmission system.

6. A system for automatic discovery of an optical cable route in an optical transmission system, comprising:

a local area network (LAN);

a database server in direct communication with the LAN, the database server maintaining a database for storing information of physically deployed optical cable routes in the optical transmission system, the information of physically deployed optical cable routes including optical cable fiber core resources;

an element management system (EMS) server in communication with the LAN to access and operate the database server;
a client in communication with the LAN;
a plurality of light source monitoring devices in communication with the LAN to transmit light source monitoring data to the EMS server for processing; and
a plurality of optical power meter monitoring devices in communication with the LAN to transmit optical power meter monitoring data to the EMS server for processing,
wherein the plurality of optical power meter monitoring devices are configured to automatically monitor optical power of receiving fibers in the optical cable and generate an optical power alarm when the optical power is beyond one of a plurality of predefined thresholds,
wherein the EMS server is configured to determine a level of the optical power alarm based on the one of the plurality of predefined thresholds and the optical cable route with which the optical power alarm is related in real time when the EMS server receives the optical power alarm, and
wherein the EMS server is configured to automatically search the database for available optical cable routes to provide options of available optical cable routes for real-time allocation of services in the optical transmission system.

7. The system according to claim 6, characterized in further comprising a network management system (NMS) server in communication with the LAN through a CORBA northbound interface.

8. The system of claim 6, wherein:
the EMS server is configured to establish optical cable data and optical cable routes of the optical transmission system and store the optical cable data and optical cable routes into the database, the optical cable data including information of the optical cables and information of the fiber cores, the information of the fiber cores being configured in the optical cable routes, the optical cable route including one or more optical cable route segments, the optical cable route segments being logic optical cables between different sites in the optical transmission system, the logic optical cables corresponding to resources of the optical cables actually used in the optical transmission system by configuring information of the optical cables and information of the fiber cores; the optical power of the fiber cores in the optical cables actually used in the optical transmission system being monitored to reflect an alarm condition of the corresponding optical cable routes.

9. The system of claim 6, wherein:
the optical power automatically monitored by the plurality of optical power meter monitoring devices comes from a source that is a monitoring light emitted by a light source at an end of the receiving fibers opposite to the optical power meter monitoring devices or a part of service light split out from the optical transmission system.

10. The system of claim 9, wherein:
the optical power alarm has four levels of a prompt alarm, a secondary alarm, a primary alarm and an urgent alarm corresponding to thresholds of 0.5 dB, 1 dB, 3 dB and 5 dB respectively.

11. The system of claim 6, wherein:
the EMS server is configured to automatically search for available optical cable routes by automatically searching for optical cable routes currently available meeting requirements of optical cable route length, attenuation of the optical cable, and number of relay sites according to start site and end site of the optical cable route, the optical cable resources recorded in the database, and the real-time optical power monitoring data when an alarm is generated relating to the optical cable route that is being used in the optical transmission system.

* * * * *